United States Patent [19]

Marx

[11] Patent Number: 4,767,832

[45] Date of Patent: Aug. 30, 1988

[54] PHENOLIC CURING AGENTS FOR EPOXY RESINS

[75] Inventor: Edward J. Marx, Houston, Tex.

[73] Assignee: Shell Oil Company, Houston, Tex.

[21] Appl. No.: 55,653

[22] Filed: May 29, 1987

[51] Int. Cl.$^4$ .................. C08G 59/62; C08G 59/68; C08G 81/00

[52] U.S. Cl. .................. 525/523; 525/529; 525/524; 525/934; 528/94; 528/104

[58] Field of Search .......... 525/523, 529, 524; 528/94, 104

[56] References Cited

U.S. PATENT DOCUMENTS

| | | | |
|---|---|---|---|
| 3,978,027 | 8/1976 | Marshall | 260/47 EP |
| 4,009,223 | 2/1977 | Noonan | 525/524 |
| 4,066,625 | 1/1978 | Bolger | 260/59 R |
| 4,075,260 | 2/1978 | Tsen et al. | 525/524 X |
| 4,186,036 | 1/1980 | Elms et al. | 528/94 X |
| 4,251,426 | 2/1981 | McClure et al. | 525/524 X |

Primary Examiner—Earl Nielsen

[57] ABSTRACT

A phenolic curing agent for epoxy resin powder coatings is prepared by combining (a) a linear phenolic hydroxyl-terminated resin having a weight per phenolic within the range of about 650 to about 8,000, preferably about 850 to about 950, (b) a dihydric phenol present in an amount such that the weight per hydroxyl of the mixture of (a) and (b) is within the range of about 240 to about 280, and (c) at least about 2 weight percent, based on the weight of the composition, of an imidazole cure accelerator. The described imidazole-accelerated curing agent is less susceptible to melting point depression and to sintering with storage than conventional imidazole-containing phenolic curing agents. The dihydric phenol-terminated epoxy resin is preferably prepared by reacting a dihydric phenol with a linear diepoxy resin in the presence of a phosphonium halide catalyst so as to produce a phenolic hydroxyl-terminated resin having a weight per hydroxyl within the range of about 650 to about 8,000.

15 Claims, No Drawings

PHENOLIC CURING AGENTS FOR EPOXY RESINS

BACKGROUND OF THE INVENTION

This invention relates to curing agents for epoxy resins. In a specific aspect, the invention relates to phenolic curing agents for epoxy coating compositions.

Bisphenol-A (BPA) terminated epoxy resins are useful as solid curing agents for epoxy powder coatings. Such phenolic curing agents are conventionally prepared by reacting about a 65:35 weight ratio of BPA with a low molecular weight liquid epoxy resin to produce a reaction product having a weight per phenolic of about 270 and made up primarily of the relatively low molecular weight BPA-terminated liquid epoxy and unreacted BPA. The uncatalyzed reaction of these phenolic curing agents with epoxy resins is very slow, and a catalyst such as 2-methylimidazole (2-MI) is often incorporated by melt-blending into the molten curing agent at the end of the production sequence.

Because of an industry need for faster curing powders, higher levels of 2-MI are desirable. It has been found, apparently because of a salt formation between 2-MI and phenolic hydroxyl, that these higher levels of 2-MI yield low melting point mixtures which tend to sinter during storage. Resins or curing agents which sinter can cause problems during application as powder coatings. Examples of such problems are the blockage of application equipment due to impact fusion and the formation of "cobwebs" during electrostatic application to hot objects.

It is therefore an object of the invention to prepare phenolic curing agents which have a weight per phenolic of approximately 270 and, when combined with imidazole cure accelerators, exhibit reduced tendency to sinter during storage.

SUMMARY OF THE INVENTION

According to the invention, a phenolic curing agent for epoxy resin powder coatings is prepared by combining (a) a linear phenolic hydroxyl-terminated resin having an equivalent weight within the range of about 650 to about 8,000, preferably about 800 to about 3000; (b) a dihydric phenol present in an amount such that the weight per phenolic of the mixture of (a) and (b) is within the range of about 240 to about 280; and (c) at least about 2 weight percent, based on the weight of the composition, of an imidazole cure accelerator. The described imidazole-accelerated phenolic curing agent is capable of maintaining an acceptably high melting point and thus is less susceptible to sintering with storage than previous imidazole-containing phenolic epoxy curing agents. The phenolic curing agent is preferably prepared by reacting a dihydric phenol wih a linear diepoxy resin having a weight per epoxide within the range of about 500 to about 8,000 in the presence of a phosphonium halide advancement catalyst to prepare an epoxy resin having a relatively high molecular weight, adding additional dihydric phenol to the reaction mixture in an amount effective for producing a reaction producf mixture comprising a phenolic hydroxyl-terminated resin and unreacted dihydric phenol, the reaction product mixture having a weight per phenolic within the range of about 240 to about 280. The curing composition is then prepared by blending this phenolic material with at least about 2 weight percent of an imidazole cure accelerator.

DETAILED DESCRIPTION OF THE INVENTION

The invention composition includes a linear phenolic hydroxyl terminated resin having a phenolic equivalent weight of from about 650 to about 8,000, preferably about 800 to about 3500, most preferably about 850 to about 950. Such a phenolic resin can be prepared by reacting the terminal epoxide groups of a diepoxy resin having a weight per epoxide of from about 500 to about 8,000 with a dihydric phenol to produce a phenolic resin having terminal hydroxyl groups attached to an aromatic terminal group. The diepoxy resin can be prepared in a catalyzed epoxy "advancement" reaction between a relatively low molecular weight epoxy and a dihydric phenol to produce a relatively high molecular weight epoxy resin. The low molecular weight epoxy resin starting material will preferably be a liquid diepoxide having an average of about 2 epoxide groups per molecule and a weight per epoxide of less than about 500, usually less than about 300. Preferred diepoxides include liquid glycidyl ethers of dihydric phenols and dihydric alcohols. Most preferred are the diglycidyl ethers of 2,2-bis(4-hydroxyphenyl)propane having an average molecular weight between about 340 and about 900 and an epoxide equivalent weight (ASTM D-1652) of between about 170 and 500. Such epoxy resins are available commercially as, for example, EPON ® Resin 828, a liquid epoxy resin having a molecular weight of about 376 and a weight per epoxide (ASTM D-1652) of about 185–192.

The dihydric phenol reactants of the advancement reaction are phenols having two hydroxyl groups attached to an aromatic or polyaromatic nucleus, such as, for example, resorcinol, catechol, 2,2-bis(4-hydroxyphenyl)propane, 4,4'-sulfonyldiphenol and dihydroxy diphenyl methane. Preferred dihydric phenols are bis(-hydroxyphenyl)alkanes, such as 2,2-bis(4-hydroxyphenyl)propane (bisphenol-A).

The advancement reaction between the relatively low molecular weight epoxy resin and the dihydric phenol is carried out in the presence of a catalytic amount of a suitable catalyst. Various classes of epoxy advancement catalysts are known in the art and include the phosphonium salt described in U.S. Pat. Nos. 3,477,990 and 4,352,918, for example. The preferred advancement catalysts are ethyl triphenylphosphonium iodide and tetramethylammonium chloride. The amount of the catalyst used in an epoxy advancement reaction can vary over a wide range, but the catalyst will generally be present in the reaction mixture in an amount of from about 0.001 to about 2 weight percent, preferably from about 0.01 to about 0.5 weight percent, based on the weight of the reactants.

The advancement reaction may be carried out in the presence or absence of solvents or diluents such as xylene, toluene or cyclohexane. Generally, the reactants will be liquid at the reaction temperature and the reaction can be carried out without the addition of solvents or diluents.

The advancement reaction is generally carried out by combining the epoxy resin and dihydric phenol reactants at a starting temperature of about 100°–120° C., adding the advancement catalyst, and allowing the reaction to exotherm to a temperature of about 160°–200° C., for a time effective for producing an advanced epoxy resin having a weight per epoxide within the range of about 500 to about 8,000, usually about 800 to about 3,500, preferably about 850 to about 950, generally for about 1-2 hours. The relative amount of the starting reactants depends upon the weight per epoxide of the advancement product desired. For the preferred advancement products having an epoxide equivalent weight of between about 850 and about 950, about 0.6 to about 0.8 mole of the dihydric phenol will generally be reacted with each mole of a liquid diglycidyl ether of bisphenol-A.

When the advancement reaction has proceeded to an epoxy resin having the desired weight per epoxide, generally within the range of about 500 to about 8000, an amount of the dihydric phenol sufficient to add phenolic terminal groups to the epoxy resin and to produce a final product having a hydroxyl equivalent weight within the range of about 240 to about 280 is added to the reaction mixture, optionally along with additional catalyst. The amount of the dihydric phenol added will depend in part upon the amount of dihydric phenol consumed in the advancement reaction, but will be a molar excess over epoxy resin present in order to ensure phenolic termination of the epoxy resin. The reaction mixture is maintained at about 160°-200° C. for about 1-2 hours and the phenolic product mixture of linear phenolic hydroxyl terminated resin and unreacted dihydric phenol is recovered. The accelerator is then mixed with the phenolic mixture, preferably by melt-blending prior to cooling, and the mixture is discharged from the reaction vessel and solidified by cooling.

The reaction product will be a mixture of a linear phenolic resin and a dihydric phenol, the dihydric phenol present in an amount such that the molar ratio of the total amount of the dihydric phenol, as a terminal group on the epoxy resin, incorporated in the advanced epoxy resin, and unreacted dihydric phenol, to the starting epoxy resin is within the range of about 2.5:1 to about 3.5:1, preferably about 3:1. When the starting material is a diglycidyl ether of bisphenol-A having a molecular weight of about 400 and a WPE of about 190 and the dihydric phenol is bisphenol-A, the weight ratio of total dihydric phenol:epoxy will fall within the range of about 63:37 to about 68:32, preferably about 65:35.

The preferred accelerators for use in the invention curing agent composition are imidazoles such as 1-methylimidazole, 2-methylimidazole, 1,2-dimethylimidazole, 2-ethylimidazole, 2,4-ethylmethylimidazole, 2-isopropylimidazole, 1-decylimidazole and 2-phenylimidazole, for example. The preferred imidazole is 2-methylimidazole. The accelerator will be present in the composition in an amount effective to increase the cure rate of the phenolic curing agent when used as a curing agent for epoxy resins, generally in an amount of at least about 1 weight percent, preferably from about 1 to about 15 weight percent, most preferably about 2 to about 12 weight percent. The depression of melting point which is addressed by the invention is most marked at levels of the imidazole greater than about 2 weight percent, and the effectiveness of the invention in maintaining an acceptably high melt point is thus most noticeable at these levels.

The final mixture of phenolic-terminated epoxy resin, dihydric phenol and accelerator will have a hydroxyl equivalent weight within the range of about 240 to about 280 and will preferably have a melting point of greater than about 75° C. even at levels of imidazole accelerator of 3 weight percent or greater.

The invention curing agent can be used with a wide variety of epoxy resins and is particularly suited for ultimate application in epoxy resin powder coating formulations. Generally the curing agent will be used with an epoxy resin in an equivalent ratio of from about 0.5 to about 1.5 equivalents of curing agent for each equivalent of epoxy resin. Powder coating formulations can be prepared by combining with the epoxy resin/curing agent system fillers, colored pigments, flow additives and the like as is known in the art.

EXAMPLE

Table 1 below describes the compositions of four experimental phenolic curatives prepared to demonstrate the improvement in melting temperature made possible by the invention.

Experimental product #1 represents a standard phenolic curative obtained by the direct reaction of a 3:1 molar ratio of bisphenol-A (BPA) with EPON ® Resin 828, the diglycidyl ether of BPA, in the presence of an ethyltriphenylphosphonium iodide advancement catalyst. The reaction mixture was heated to 180° C. and held for 2 hours. Experimental product #2 represents the product of a two-stage reaction in which an epoxy terminated resin of about 900 WPE is first prepared and subsequently reacted with an excess of BPA to form a phenolic curative. Experimental product #3 represents a product of a two-stage addition in which a phenolic hydroxyl terminated resin of about 1400-1500 equivalent weight is first prepared followed by the addition of BPA. Experimental product #4 represents the product of a two-stage reaction in which a relatively high equivalent weight resin (2769 WPE target) is first prepared and subsequently reacted with an excess of BPA to form a phenolic curative. In runs 2, 3 and 4, the reaction mixtures were heated to 180° C. and held for 1 hour for the first stage reaction and an additional hour for the second stage. 2-Methyl imidazole was added to each at the end of the two hour reaction and blended for 15 minutes.

In all cases, the total weight ratio of BPA to starting epoxy resin was 65:35. The resultant phenolic hydroxyl equivalent weight in each case had a theoretical value of about 260-270.

TABLE 1

| | Compositions of Accelerated Linear Phenolic Curatives | | | |
|---|---|---|---|---|
| | #1 | #2 | #3 | #4 |
| Step 1 | | | | |
| EPON ® Resin 828 | 35 | 35 | 35 | 35 |
| Bisphenol-A | 65 | 15 | 26 | 19 |
| ETPPI | (.10) | (.05) | (.10) | (.05) |
| Target Eq. Wt. | — | 900 | 1456* | 2769 |
| Step 2 | | | | |
| Bisphenol-A | — | 50 | 39 | 46 |
| ETPPI | — | (.05) | — | (.05) |
| | 100 | 100 | 100 | 100 |

*Weight per phenolic hydroxyl

Table 2 shows the melting points of the experimental curatives described above. Generally, allowing for normal experimental deficiencies, materials 2A, 3A and 4A show increased melting points relative to 1A. In addition, all generally show decreased melting points as the level of 2-methylimidazole is increased. Experimental materials 2 A-E, 3 A-E and 4 A-E, however, all have melting points higher than material 1A through E, and higher than the target 75° C.

TABLE 2

| | Melt Points (°C.) of Linear Phenolic Curing Agents | | | | |
|---|---|---|---|---|---|
| | Imidazole Content | #1 | #2 | #3 | #4 |
| A | 0 | 75.4 | 76.2 | 83.4 | 93.2 |
| B | 2.0 | 73.5 | 86.4 | 83.5 | 91.1 |
| C | 3.5 | 74.3 | 84.1 | 81.5 | 90.2 |
| D | 5.0 | 72.2 | 84.3 | 82.3 | 89.5 |
| E | 10.0 | 71.9 | 78.1 | 79.5 | 86.8 |

I claim:

1. A composition comprising:
   (a) a linear phenolic hydroxyl-terminated resin having a phenolic equivalent weight within the range of about 650° to about 8,000;
   (b) a dihydric phenol present in the composition in an amount such that the weight per phenolic of a mixture of (a) and (b) is within the range of about 240 to about 280; and
   (c) an imidazole compound present in an amount of at least about 2 weight percent, based on the weight of the composition.

2. The composition of claim 1 in which the dihydric phenol is bisphenol-A.

3. The composition of claim 1 in which the linear phenolic hydroxyl-terminated resin is a product of advancing a linear diepoxy resin having a weight per epoxide within the range of about 170 to about 210 with a dihydric phenol to an advanced epoxy resin having a weight per epoxide within the range of about 500 to about 3500, and reacting said advanced epoxy resin with a molar excess of a dihydric phenol under conditions effective to produce a linear phenolic hydroxyl-terminated resin having a phenolic equivalent weight within the range of about 650 to about 8,000.

4. The composition of claim 1 in which the linear phenolic hydroxyl-terminated resin is a reaction product of bisphenol-A and a linear diglycidyl ether of bisphenol-A.

5. The composition of claim 1 in which the imidazole compound is selected from 1-methylimidazole, 2-methyl imidazole, 2,4-ethylmethylimidazole, 2-isopropylimidazole, 1-decylimidazole and 2-phenylimidazole.

6. The composition of claim 1 in which the imidazole compound is present in an amount of from about 3 to about 12 weight percent.

7. The composition of claim 6 in which the imidazole compound is 2-methylimidazole.

8. The composition of claim 1 which has a melting point greater than about 75° C.

9. A process for preparing a curing agent for an epoxy resin, said process comprising:
   (a) contacting a linear diepoxy resin having a weight per epoxide within the range of about 170 to about 210 with a dihydric phenol in the presence of a catalytic amount of an epoxy advancement catalyst under conditions effective to produce a diepoxy resin having an average weight per epoxide within the range of about 500 to about 8000;
   (b) contacting the reaction product of step (a) with a molar excess of the dihydric phenol in the presence of the advancement catalyst to produce a linear phenolic hydroxyl-terminated resin having a weight per hydroxyl within the range of about 240 to about 280; and
   (c) adding to the product of step (b) at least about 2 weight percent of an imidazole compound.

10. The process of claim 9 in which the linear diepoxy resin is a diglycidyl ether of bisphenol-A.

11. The process of claim 9 in which the dihydric phenol is bisphenol-A.

12. The process of claim 9 in which the imidazole compound is 2-methyl imidazole.

13. The process of claim 9 in which the diepoxy resin product of step (a) has a weight per epoxide within the range of about 850 to about 950.

14. A powder coating composition comprising the composition of claim 1.

15. A powder coating composition comprising the curing agent product of the process of claim 9.

* * * * *